Nov. 23, 1926.
E. C. NORTON
PISTON RING
Filed March 2, 1926
1,607,779
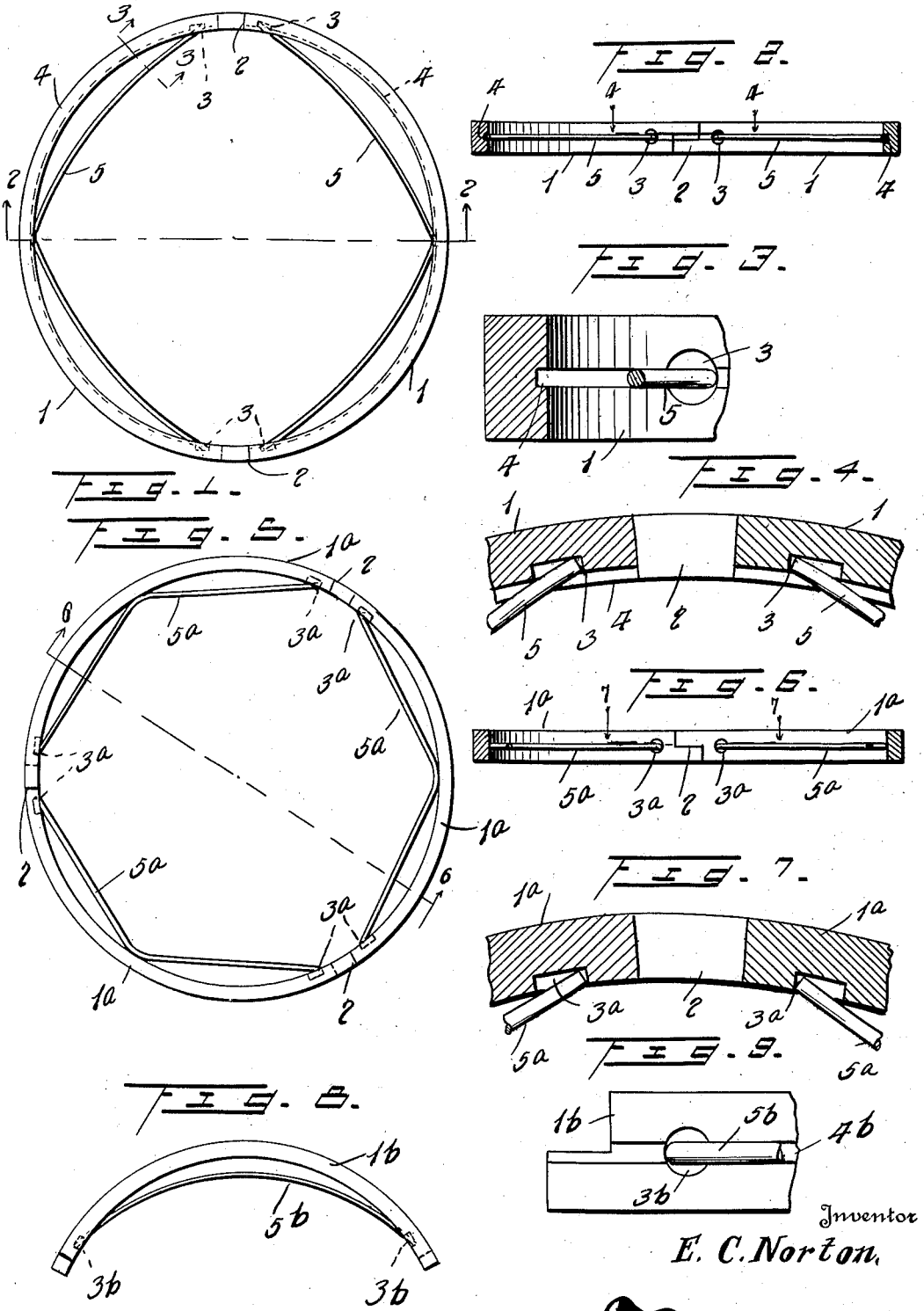
Inventor
E. C. Norton,
By 
Attorney Patented Nov. 23, 1926.

1,607,779

UNITED STATES PATENT OFFICE.

ERNEST C. NORTON, OF MOLINE, ILLINOIS.

PISTON RING.

Application filed March 2, 1926. Serial No. 91,732.

This invention relates to improvements in piston rings for internal combustion engines and more particularly to rings of this kind that embody two or more sections.

The invention has for one of its objects the provision of a sectional piston ring with novel, simple and inexpensive spring means adapted to hold it in such contact with the cylinder as to prevent gas and oil from passing by the piston.

The invention comprehends a piston ring having each section thereof provided in its inner side and adjacent its ends with sockets, and a round spring located at the inner side of each section and having its ends positioned in the sockets thereof, the springs being adapted to bear against the piston and exert outward pressure on the ring sections. The invention also comprehends a piston ring wherein the sockets are of greater width than the diameter of the springs whereby to permit the ends of the latter to be readily inserted in the former. The invention further comprehends the provision of a piston ring wherein the sections thereof are provided in their inner sides with grooves which communicate with the sockets and are provided for the reception of the springs when the latter are tensioned sufficiently to carry the outer sides of the ring sections into the plane of the lateral surface of the piston during the application of the ring to the piston.

The invention is hereinafter fully described and claimed, and illustrated in the accompanying drawing, wherein:

Figure 1 is a plan view of the piston ring embodying my invention,

Figure 2 is a sectional view taken on the plane indicated by the line 2—2 of Figure 1, Figure 3 is a detail sectional view taken on the plane indicated by the line 3—3 of Figure 1, Figure 4 is a detail sectional view taken on the plane indicated by the line 4—4 of Figure 2, Figure 5 is a plan view of a slightly modified form of the piston ring, Figure 6 is a sectional view taken on the plane indicated by the line 6—6 of Figure 5, Figure 7 is a detail sectional view taken on the plane indicated by the line 7—7 of Figure 6, Figure 8 is a plan view illustrating the application of a slightly modified form of spring to one of the sections of the ring shown in Figure 1, and Figure 9 is an elevational view of a fragmentary portion of the structure shown in Figure 8.

Corresponding and like parts are referred to in the following description, and designated in the several views of the accompanying drawing, by similar reference characters.

In the drawing, 1 designates the sections of a piston ring. This ring is shown as comprising two sections, and the ends of the sections are reduced and overlapped as shown at 2. Each section 1 is provided in its inner side and adjacent its ends with sockets 3 which are preferably cylindrical and located centrally between the upper and lower sides of the sections. Each ring section 1 is provided in its inner side with a circumferentially extending groove 4 which is located centrally between the upper and lower sides of the section and intersects the sockets 3. The sockets 3 are deeper and of greater diameter than the grooves 4. An angular spring 5 of cylindrical formation in cross section is applied to each ring section 1 by having its ends positioned in the sockets 3 and having its apex positioned in the groove 4. The sockets 3 are of greater diameter than the corresponding dimension of the springs 5, and the grooves 4 are of slightly greater width than the diameter of the springs. The springs 5 have a chordal relation to the inner sides of the ring sections 1 and are adapted to contact with the piston to exert an outward pressure on the ring sections, such pressure holding the ring sections in such contact with the cylinder as to prevent gas and oil passing by the piston. The length of each spring 5 is greater than the greatest distance between the sockets 3 of each ring section 1, and due thereto the mere application of the springs to the ring sections places them under tension with the result that their ends are held in such contact with the outer sides of the sockets 3 as to prevent them from becoming accidentally detached from the ring sections during the application of the ring sections to the piston. In this form of the invention the engagement of apexes of the springs 5 in the grooves 4 assist in holding the springs in place.

As shown in Figures 5, 6 and 7, the piston ring may consist of three instead of two sections. These sections are designated 1ª and each is provided with sockets 3ª for the reception of the springs 5ª. These ring sections may or may not be provided in their inner sides with grooves, and as shown they are not provided with grooves.

In Figures 8 and 9 a slightly modified form of spring is shown. This spring is designated 5ᵇ and is of arcuate formation, and is shown as applied to the ring section 1ᵇ provided with sockets 3ᵇ and a groove 4ᵇ.

From the foregoing and accompanying drawing, it should be apparent that when the ring is in place the springs will bear against the piston and exert an outer and upwardly directed pressure on the ring sections. The ring is thus expanded and held in such contact with the cylinder as to prevent the passage of gas and oil by the piston. As the springs cannot become accidentally detached from the ring sections the ring may be readily and quickly applied to a piston. As the sockets 3 are of a greater diameter than the corresponding dimension of the springs, the latter may be readily applied to the ring sections.

It should be understood that the drawing is merely illustrative and does not pretend to give exact proportions. Furthermore, the said drawing is illustrative of a preferred constructon, it being my expectation that various changes and modifications may be made without departing from the spirit and scope of my invention.

What is claimed is:—

1. A piston ring comprising sections of which each is provided in its inner side adjacent its ends with sockets opening only out through said side thereof, each section also having in its inner side a groove communicating with the sockets, and springs having their ends positioned in the sockets and standing out from the inner side of the ring.

2. A piston ring comprising sections of which each is provided in its inner side and adjacent its ends with sockets, each ring section being provided in its inner side with a groove communicating with the sockets, and angular springs having their ends positioned in the sockets and their apexes in the grooves.

3. A piston ring comprising similar sections of which each is provided in its inner side and adjacent its ends with sockets, each ring section being provided in its inner side with a groove communicating with the sockets, and angular springs having their ends positioned in the sockets and their apexes in the grooves, said springs being of circular form in cross section, the grooves being wider than the diameter of the springs and the sockets being wider than the grooves.

In testimony whereof I affix my signature.

ERNEST C. NORTON.